(12) United States Patent
Ohta

(10) Patent No.: US 7,255,664 B2
(45) Date of Patent: Aug. 14, 2007

(54) STARTING CLUTCH CONTROL DEVICE

(75) Inventor: Yoshikazu Ohta, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 308 days.

(21) Appl. No.: 11/154,954

(22) Filed: Jun. 17, 2005

(65) Prior Publication Data

US 2006/0009327 A1    Jan. 12, 2006

(30) Foreign Application Priority Data

Jun. 18, 2004   (JP) .............................. 2004-181716

(51) Int. Cl.
*B60W 10/02*   (2006.01)
(52) U.S. Cl. .................. 477/175; 477/180; 477/77; 477/83
(58) Field of Classification Search ............. 477/174, 477/175, 176, 180, 70, 77, 83, 79, 80, 84, 477/86, 90, 91; 701/67, 68
See application file for complete search history.

(56) References Cited

U.S. PATENT DOCUMENTS

| 4,860,863 | A | * | 8/1989 | Hayashi ....................... 477/39 |
| 5,766,110 | A |   | 6/1998 | Kanno et al. |
| 6,565,483 | B2 | * | 5/2003 | Segawa et al. ............. 477/174 |
| 2007/0026993 | A1 | * | 2/2007 | Kawamoto et al. ........... 477/70 |

* cited by examiner

*Primary Examiner*—Roger Pang
(74) *Attorney, Agent, or Firm*—Global IP Counselors, LLP

(57) ABSTRACT

A starting clutch control device includes a starting clutch disposed between an engine and a transmission installed to a vehicle. A torque coefficient setting section sets a torque coefficient based on a clutch speed ratio of the starting clutch and a throttle opening of the engine. A torque coefficient correction section increases the torque coefficient by a torque coefficient correction amount, increasing the torque coefficient by a progressively larger torque coefficient correction amount as the throttle opening increases, in order to increase the torque coefficient within a region of smaller clutch speed ratios (e.g., clutch speed ratios less than approximately 0.5). A hydraulic pressure control section controls hydraulic pressure supplied to the starting clutch based on the torque coefficient and the rotational speed of the engine.

17 Claims, 4 Drawing Sheets

STARTING CLUTCH CONTROL DEVICE

CROSS-REFERENCE TO RELATED APPLICATIONS

The present application claims priority under 35 U.S.C. § 119 of Japanese Patent Application No. 2004-181716, filed on Jun. 18, 2004, the entire content of which is expressly incorporated by reference herein.

BACKGROUND OF THE INVENTION

1. Field of the Invention

The present invention generally relates to a starting clutch control device for controlling a starting clutch installed between an engine and a transmission. More specifically, the starting clutch control device controls the transfer of torque the engine and the transmission by the starting clutch.

2. Description of Related Art

In a conventional clutch control system, the hydraulic pressure determining vehicle starting friction applied by a starting clutch is usually based on torque coefficients and engine rotational speed. This conventional clutch control system sets an increasingly smaller torque coefficient as the throttle opening increases to improve drivability and reduce fuel consumption by adequately absorbing engine torque shocks (which are generated by sudden acceleration, engine braking, and other factors) over a wide range of engine-clutch speed ratios, including ratios induced by engine braking. An example of this type of conventional clutch control system is disclosed in Japanese Patent No. 2784500, or family member U.S. Pat. No. 5,766,110.

In view of the above, it will be apparent to those skilled in the art from this disclosure that there exists a need for an improved starting clutch control device. This invention addresses this need in the art as well as other needs, which will become apparent to those skilled in the art from this disclosure.

SUMMARY OF THE INVENTION

It has been discovered that the aforementioned conventional technology exhibits the shortcoming of a slow response time in the supply of hydraulic pressure to the starting clutch. The result of this slow response time is that excessive engine rotational speed occurs immediately after vehicle initiates movement. The extent of this excessive engine rotational speed is directly proportional to the extent of throttle opening.

In order to rectify the above-noted shortcoming, the present invention offers a starting clutch control device that is able to suppress excessive engine RPM during initial vehicle starting.

Basically, the starting clutch control device includes a starting clutch disposed between an engine and a transmission installed to a vehicle or automobile, a torque coefficient setting device that establishes a starting clutch torque coefficient based on the clutch speed ratio of the starting clutch and throttle opening, and a hydraulic pressure control section that controls the supply of hydraulic oil to the starting clutch based on the torque coefficient and engine rotational speed. A torque coefficient correction method is used to apply a larger torque coefficient correction in relation to larger throttle openings in order to obtain a larger torque coefficient within a region of smaller speed ratios.

According to one version of the present invention, The starting clutch control device of the present invention basically includes a starting clutch, a torque coefficient setting section, a torque coefficient correction section and an engaging pressure control section. The starting clutch is configured and arranged to be operatively coupled between an engine and a transmission installed in a vehicle. The torque coefficient setting section is configured to set a torque coefficient based on a clutch speed ratio of the starting clutch and a throttle opening of the engine. The torque coefficient correction section is configured to increase the torque coefficient by a torque coefficient correction amount. The torque coefficient correction section is further configured to increase the torque coefficient by a progressively adjusting the torque coefficient correction amount as the throttle opening increases when the clutch speed ratio is within a predetermined clutch engagement speed ratio region. The engaging pressure control section is configured to control an engaging pressure supplied to the starting clutch based on the torque coefficient and an engine rotational speed of the engine.

In this case, the torque coefficient correction section may increases the torque coefficient within a progressively larger region starting at a zero speed ratio as a response time lag for the hydraulic pressure applied to the starting clutch increases. Alternatively, or in addition, the torque coefficient correction section increases the torque coefficient by a progressively larger torque coefficient correction amount as excessive engine RPM increases.

Further alternatively, or in addition, the torque coefficient setting section switches between a lesser torque coefficient range employed both for a throttle opening of approximately zero and for a throttle opening range larger than a predetermined value, and a greater torque coefficient range employed for a throttle opening range extending from above approximately zero to a throttle opening less than or equal to the predetermined value. The torque coefficient correction section increases the torque coefficient separately for the lesser torque coefficient range and for the greater torque coefficient range. In this case, the torque coefficient correction section may increase the torque coefficient for the lesser torque coefficient range within a region of speed ratios below substantially 0.25, and for the greater torque coefficient range within a region of speed ratios below substantially 0.3.

According to another version of the invention, a method of controlling a vehicle starting clutch disposed between an engine and a transmission installed to a vehicle, includes reading a clutch speed ratio of the starting clutch, reading a throttle opening of the engine, and reading an engine RPM of the engine. The method also includes setting a torque coefficient based on the clutch speed ratio and the throttle opening, the torque coefficient relating to a desired amount of torque to be transmitted by the starting clutch. The method further includes correcting the torque coefficient by increasing the torque coefficient by a progressively larger torque coefficient correction amount within a limited region of the clutch speed ratios starting at a zero speed ratio, and setting an engaging pressure to be applied within the starting clutch according to the engine RPM and to the torque coefficient as corrected.

Optionally, the correcting includes increasing the torque coefficient within a progressively larger region starting at a zero speed ratio as a response time lag for the engaging pressure applied to the starting clutch increases. Alternatively or in addition, the correcting includes increasing the torque coefficient by a progressively larger torque coefficient correction amount as excessive engine RPM increases.

Further alternatively or in addition, the setting includes switching between a lesser torque coefficient range employed both for a throttle opening of approximately zero and for a throttle opening range larger than a predetermined value, and a greater torque coefficient range employed for a throttle opening range extending from above approximately zero to a throttle opening less than or equal to the predetermined value. In this case, the correcting may include increasing the torque coefficient separately for the lesser torque coefficient range and for the greater torque coefficient range. Further, the correcting may include correcting the torque coefficient for the lesser torque coefficient range within a region of the clutch speed ratios below substantially 0.25, and for the greater torque coefficient range within a region of the clutch speed ratio below substantially 0.3.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

The embodiments of the present invention are explained in the following, in reference to the above-described drawings. The first embodiment of the vehicle starting clutch control device is able to suppress excessive engine rotational speed. A transmission controller increases the correction applied to the torque coefficient in relation to an increasingly large throttle opening when the input and output RPM speed ratio (output RPM/input RPM) of a starting clutch lies within a region of smaller ratios. The first embodiment of the starting clutch control device is described below.

Figure 1:
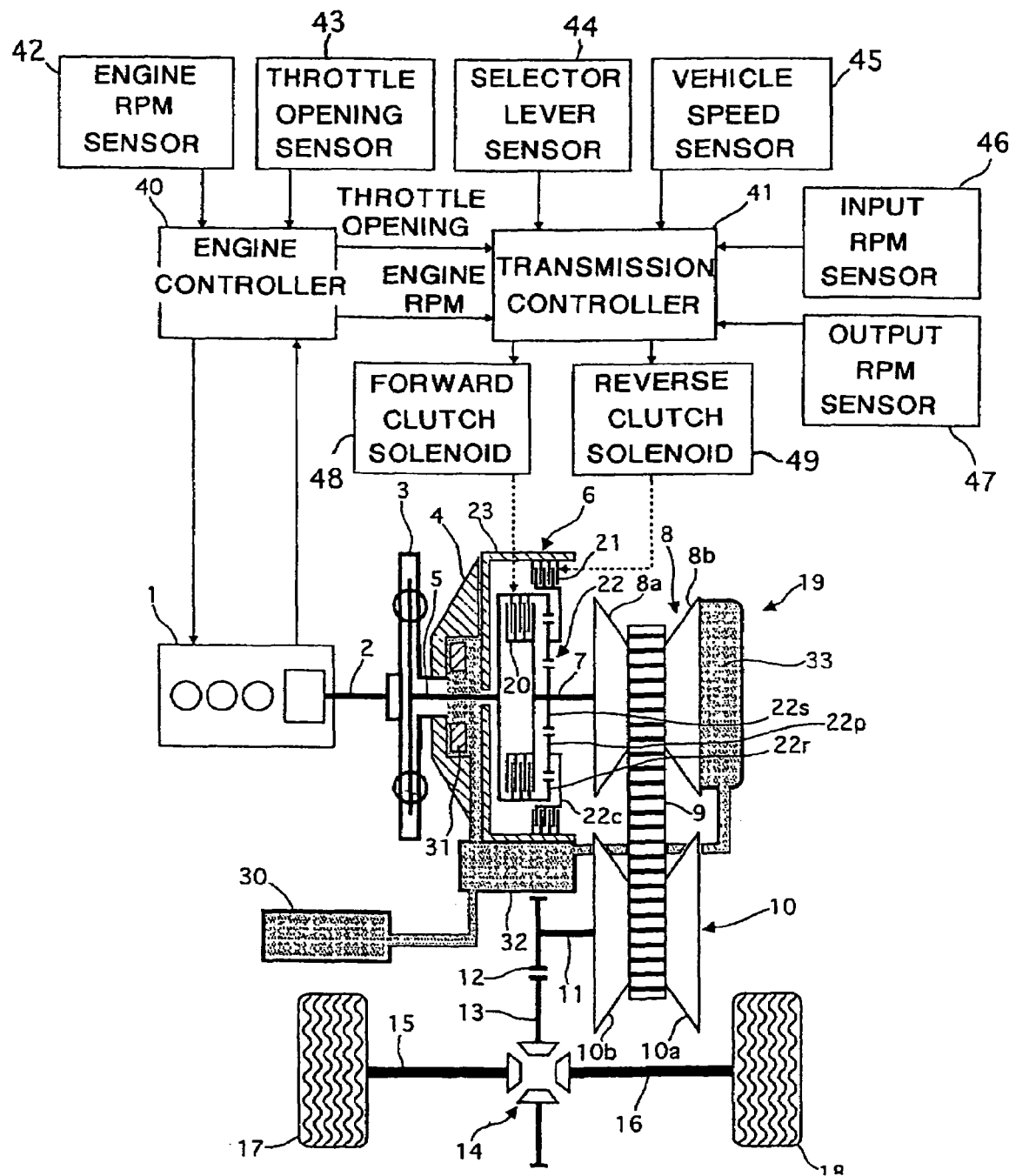
FIG. 1 is a system diagram of the power and control systems of a vehicle equipped with a belt-type stepless transmission making use of a starting clutch control device in accordance with a first embodiment.

Referring initially to FIG. 1, a vehicle is schematically illustrated in accordance with one embodiment of the present invention. The vehicle basically includes an engine 1, a forward-reverse switching mechanism 6 (which includes a starting clutch 20, and a reverse brake or clutch 21), a belt-type stepless transmission 19 that provides stepless speed changes between its input and output sides, an output gear 12 and a drive gear 13 that reduce output speed, and a left and right drive wheel 17 and 18 which are respectively driven by a differential gear 14 through drive shafts 15 and 16. The belt-driven stepless transmission is also known as a belt-driven continuously variable transmission or CVT.

The engine 1, which may be a gasoline, diesel, or other engine equipped with a clutch that engages in order to transfer engine torque as the input torque required to start a vehicle, includes an engine output shaft 2 which connects to the input part of a torsional damper 3.

The torsional damper 3, which has an input part connected to an engine output shaft 2 and an output part connected to a transmission input shaft 5, provides a rotating connection between the shafts 2 and 5 through a torsion spring. Moreover, the output part is fixedly attached to a flywheel 4 and forms an integral one-piece assembly therewith.

The forward-reverse switching mechanism 6 includes a simple planetary gear set 22 which is able to change rotating direction and gear ratio, a starting clutch 20 which engages when the vehicle is to be driven forward, and a reverse brake or clutch 21 which engages when the vehicle is to be driven in reverse. The starting clutch 20 and the reverse brake 21 are structures that take part in the operation of the starting clutch control device.

The simple planetary gear set 22 includes a transmission sun gear 22s which concentrically rotates with the transmission input shaft 5, a plurality of (planetary) pinion gears 22p which mesh with and rotate around the sun gear 22s, a ring gear 22r which meshes with the pinion gears 22p, and a carrier 22c supporting the pinion gears 22p (which rotate freely thereon). The sun gear 22s connects to the driven side of the starting clutch 20 and to the primary pulley shaft 7. Moreover, the ring gear 22r is connected with the driving side of forward starting clutch 20 on the side on which the carrier 22c is fixed by the reverse brake 21.

The starting clutch 20 includes a plurality of plates disposed on the drive side part, which is connected to transmission input axis 5, and a plurality of plates disposed on and the driven side part, which is connected with to a primary pulley axis 7. The clutch 20 is engaged by the application of hydraulic clutch pressure, supplied by the operation of a piston (not shown in the drawing), which forces the plates together and thus connects the driving side to the driven side. The release of clutch hydraulic pressure disengages the clutch and thus prevents power transmission to the output side. It thereby becomes possible to change among a disengaged state in which hydraulic oil is not supplied to forward starting clutch and no power can be transmitted, and semi-engaged and engaged input/output states, in which hydraulic oil may be supplied at a pressure to engage the clutch, or at a pressure less than that required to completely engage the clutch, but sufficient to allow the clutch to slip and also to transmit power, applying various amounts of torque depending on the clutch hydraulic pressure.

The reverse brake or clutch 21 includes a plurality of plates disposed on the internal fixed part of a transmission case 23, and also on a fixable brake part connected to the carrier 22c. The brake 21 is engaged by the application of hydraulic braking pressure, supplied by the operation of a piston (not shown in the drawing), which locks the plates on the fixable brake part to the plates on the internal fixed part, thus forming a single joined assembly of the internal fixed part of the transmission case 23 and the fixable brake part of the carrier 23c which prevents the rotation of the carrier 22c. The brake is disengaged when the piston releases hydraulic brake pressure which allows the fixable brake (clutch) part and the carrier 22c to rotate.

A belt-type stepless transmission 19 (hereafter referred to as the transmission 19) is able to steplessly change gear ratios between its input and output shafts. The transmission 19 includes a primary pulley 8 which is connected to a primary pulley shaft 7, a secondary pulley 10 which is connected to a secondary pulley shaft 11, and a CVT belt 9 riding on and between the primary pulley 8 and the secondary pulley 10. The primary pulley 8 includes a fixed sheave 8a oppositely disposed to a moving sheave 8b, or like component, which is able to move toward or away from the fixed sheave 8a. In the same manner, a secondary pulley 10 includes a fixed sheave 10a oppositely disposed to a moving sheave 10b which is able to move toward or away from the fixed sheave 10a. A hydraulic control unit 32 governs the hydraulic pressure applied to the primary pulley hydraulic chamber 33 which is installed to the rear part of the moving sheave 8b of the primary pulley 8, thus forming a mechanism through which the moving sheave 8b can be brought closer to or moved farther from the sheave 8a in order to execute the clutch speed ratio changing function of the transmission. Moreover, an oil pump 31 draws hydraulic oil from an oil tank 30 and supplies it to the hydraulic control unit 32. The mechanism for moving the secondary moving sheave 10b is not shown in the drawings, but would be readily arranged by one of ordinary skill in the art.

The following first embodiment will describe, with reference to FIG. 1, the system used to control the automobile equipped with the belt-type stepless transmission.

The above-noted system is equipped with an engine controller 40 which provides an electronic control function for the engine 1, a transmission controller 41 which provides an electronic control function for the hydraulic control unit 32 and is connected to the forward-reverse switching mechanism 6 and the transmission 19, and various sensors connected to the transmission controller 41 and the engine controller 40.

An engine RPM sensor 42, which monitors the rotational speed (RPM) of the engine output shaft 2, and a throttle opening sensor 43, which monitors the extent to which the accelerator pedal is depressed, are connected to the engine controller 40 in order to input data relating to engine RPM and throttle opening. Engine rotational speed (RPM) data and throttle opening data are also input to the transmission controller 41 from the engine controller 40.

Additional components supply the transmission controller 41 with data relating to the position of a transmission selector lever (hereafter referred to as the selector lever), vehicle speed, input RPM, output RPM, and other data items. These components include a selector lever sensor 44 which monitors the position of the selector lever, a vehicle speed sensor 45 which monitors vehicle speed, an input RPM sensor 46 which monitors the rotational speed of transmission input shaft 5 of forward-reverse switching mechanism 6, and an output RPM sensor 47 which monitors the rotational speed of the primary pulley shaft 7 which is connected to the output shaft of the forward-reverse switching mechanism 6.

Although this embodiment obtains the input RPM of the forward-reverse switching mechanism 6 from the input RPM sensor 46 installed thereto, the engine RPM sensor 42 may be utilized in place of the input RPM sensor 46 for this function, as the engine RPM can be considered equivalent to the RPM input to the forward-reverse switching mechanism 6. In other words, the input RPM sensor 46 and the engine RPM sensor 42 are each structurally and functionally an "engine RPM sensor".

A forward starting clutch solenoid 48 and a reverse brake or clutch solenoid 49, both of which control hydraulic pressure, are connected to the transmission controller 41, the solenoid 48 controlling hydraulic pressure supplied to forward starting clutch 20, and the solenoid 49 controlling hydraulic pressure supplied to reverse brake (clutch) 21. Based on the data obtained from the previously noted sensors, the transmission controller 41 controls operation of the forward starting clutch solenoid 48 and the reverse brake (clutch) solenoid 49 in order to switch the operating status of the forward starting clutch 20 and the reverse brake (clutch) 21 between fully engaged, partially engaged (slipping), and released conditions. The transmission controller 41 also controls the hydraulic pressure supplied to the primary pulley hydraulic chamber 33 through a solenoid valve (not shown in the drawings) installed within the hydraulic control unit 32.

The output gear 12, which is fixedly attached to the end of the secondary pulley shaft 11 which in turn connects to the second pulley 10 of the transmission 19, meshes with the drive gear 13 which has a diameter greater than the output gear 12.

Two pinions of the differential gear 14 are fixedly attached to drive gear 13 and mesh with side gears positioned to the right and left of the pinions. These two side gears are respectively attached to two drive shafts 15 and 16, which in turn connect to and drive a left drive wheel shaft and a right drive wheels shaft 17 and 18.

During Vehicle Stop

The following will explain operation of the control system when the vehicle is stopped.

The oil pump 31 supplies hydraulic oil to the hydraulic controller unit 32 when the engine 1 is running. When the selector lever is placed in the "P" (park), or "N" (neutral) position in which the vehicle remains stationary, hydraulic oil is not supplied to the forward starting clutch 20 and the reverse brake 21, thereby leaving the clutch 20 and brake 21 in a disengaged condition. As a result, power from the transmission input shaft 5 is not applied to the primary pulley shaft 7, the transmission 19 does not rotate, and power is not conveyed to the drive wheels 17 and 18.

Conversely, if the selector lever is placed in the "D" (drive) or "R" (reverse) position, either of which determines that the vehicle is to move, hydraulic oil is supplied, during a predetermined time from stopping, to the starting clutch in the starting clutch 20 and reverse brake 21, in response to the selector lever position, at a pressure which generates the friction required for vehicle starting. Hydraulic oil, however, is supplied at a pressure less than that required for the vehicle starting clutch control device to completely engage the clutch, but sufficient to allow the clutch to slip to an extent which allows the vehicle to move slowly, or "creep." Moreover, when the vehicle is stopped with the selector lever set to the "D" or "R" position, the hydraulic pressure applied to the starting clutch 20 or reverse brake 21 need not maintain a pressure allowing the vehicle to creep, but may be applied in relation to throttle opening as is the case with a conventional transmission.

Vehicle Advancement and Forward Motion

When the selector lever has been moved from a stationary setting to a forward motion setting with the engine running, or when a depressed brake pedal is released after the vehicle has been stopped for predetermined time even if the selector lever is in a forward motion setting, the transmission controller 41 activates a valve (not shown in the drawings) in the hydraulic control unit 32 in order to supply hydraulic oil to the forward starting clutch 20 (from which hydraulic oil has been expelled).

At this time, the hydraulic pressure applied to the starting clutch 20 is determined by the transmission controller 41. That is, the transmission controller 41 sets a torque coefficient based on a clutch speed ratio (output RPM/input RPM) calculated from the input and output RPM data obtained from the input RPM sensor 46 and the output RPM sensor 47, and controls the amount of hydraulic pressure applied to the forward starting clutch 20 based the torque coefficient and on an engine RPM obtained from the engine RPM sensor 42. The torque coefficient will be explained subsequently in greater detail.

When the vehicle is stationary and the selector lever is moved to the "D" or "R" position, the transmission assumes "creeping" status, the hydraulic pressure is controlled in relation to throttle opening, and the control of the hydraulic pressure in the starting clutch 20 is, in the same manner as described previously, based on the engine RPM and the torque coefficient setting, relating to the clutch speed ratio of forward-reverse switching mechanism 6.

The hydraulic pressure applied to the starting clutch 20 results in the clutch 20 bringing the simple planetary gear set 22 of the forward-reverse switching mechanism 6 into a directly connected state, transmitting torque at a level that suppresses excessive engine RPM, the level of transmitted torque being determined by the hydraulic pressure engaging the clutch 20. Moreover, the transmission 19 has concurrently shifted to a lower gear ratio and the vehicle has begun to move forward. When vehicle speed increases, the transmission controller 41 shifts the transmission 19 into higher gear ratios during which control can be based on throttle opening and load on the vehicle.

To be more specific, while the vehicle is moving, the transmission 19 operates pursuant to the transmission controller 41 determining a target gear ratio based on vehicle speed data obtained from the vehicle speed sensor 45, applying throttle opening and engine RPM data obtained from the engine controller 40, and adjusting the hydraulic pressure applied to the primary pulley chamber 33, in order to achieve the target gear ratio (through the controlled displacement of the moving sheaves 8*b* and 10*b* of the primary pulley 8 and the secondary pulley 10 respectively). The output of the transmission 19, which has been determined by the target gear ratio, is transmitted to the drive wheels 17 and 18 through the output gears 12, the drive gear 13, the differential gears 14, and the drive shafts 15 and 16 in order to drive the vehicle in a forward or reverse direction.

Moreover, hydraulic pressure is not applied to the reverse brake 21 in the selector's forward movement position, thereby placing the reverse brake 21 in a released condition.

When the selector lever is set to the "R" position, the hydraulic pressure applied to the reverse brake 21 is determined according to the torque coefficient and engine RPM in the same manner as is executed when the selector lever is set to the "D" position for vehicle forward movement. At this time, the simple planetary gear set 22 of forward-reverse switching mechanism 6 rotates at a faster speed in the reverse direction, and the reverse brake 21 engages to transfer torque to an extent that suppresses excessive engine RPM, the torque level applied to the reverse brake 21 relating to the amount of hydraulic pressure determined in the previously explained manner. The transmission 19 is shifted into a low gear and the vehicle is set in reverse motion. The transmission 19 is then able to operate at a vehicle speed based on throttle opening and the load on the vehicle.

Vehicle Starting Control Data Processing

Figure 2:
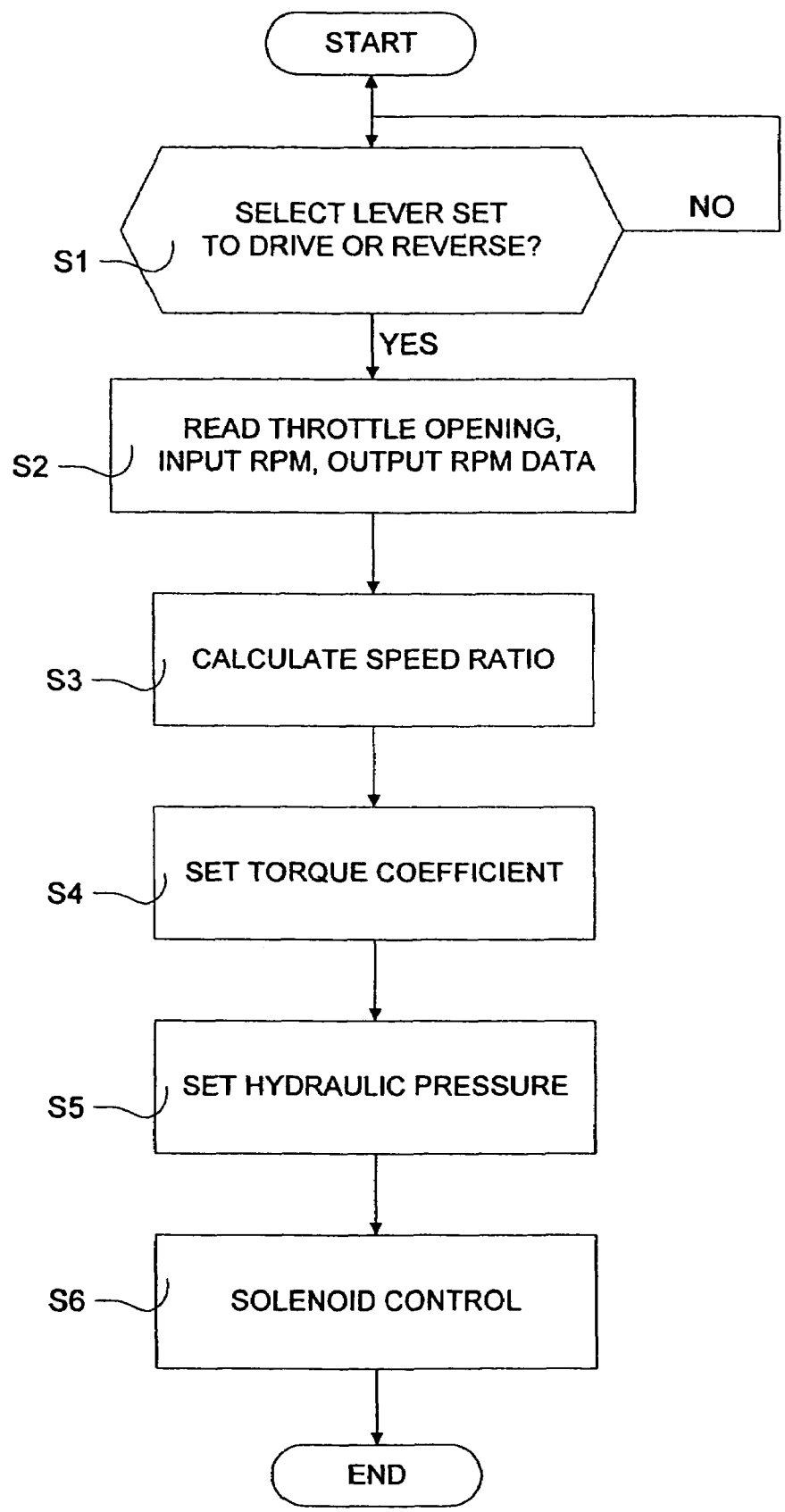
FIG. 2 is a flow chart explaining the starting clutch control sequence executed by the transmission controller in the first embodiment.

FIG. 2 is a flow chart illustrating the data processing sequence executed by the transmission controller 41 according to the first embodiment to control vehicle starting, i.e., a set of program routines executed by the transmission controller 41. The following will explain the data processing sequence applied to vehicle starting control based on the flow chart.

A determination is made at step S1 whether the selector lever is been set to the "D" or "R" vehicle movement position, based on the selector lever position data obtained from the selector lever sensor 44. A "no" result will return the sequence to step S1, while a "yes" result will enable the sequence to proceed to step S2.

At step S2, the throttle opening data is read in from the throttle opening sensor 43, and the input and output RPM data is read in from the input and output RPM sensors 46 and 47 at the respective input and output sides of the forward-reverse switching mechanism 6. The input and output RPM sensors 46 and 47 constitute a clutch speed ratio sensor. After the data is read-in, the sequence proceeds to step S3.

At step S3, the output and input RPM are calculated from the input and output RPM data read in at step S2, and the clutch speed ratio for the forward-reverse switching mechanism 6 is obtained, after which the sequence proceeds to step S4.

Figure 3:
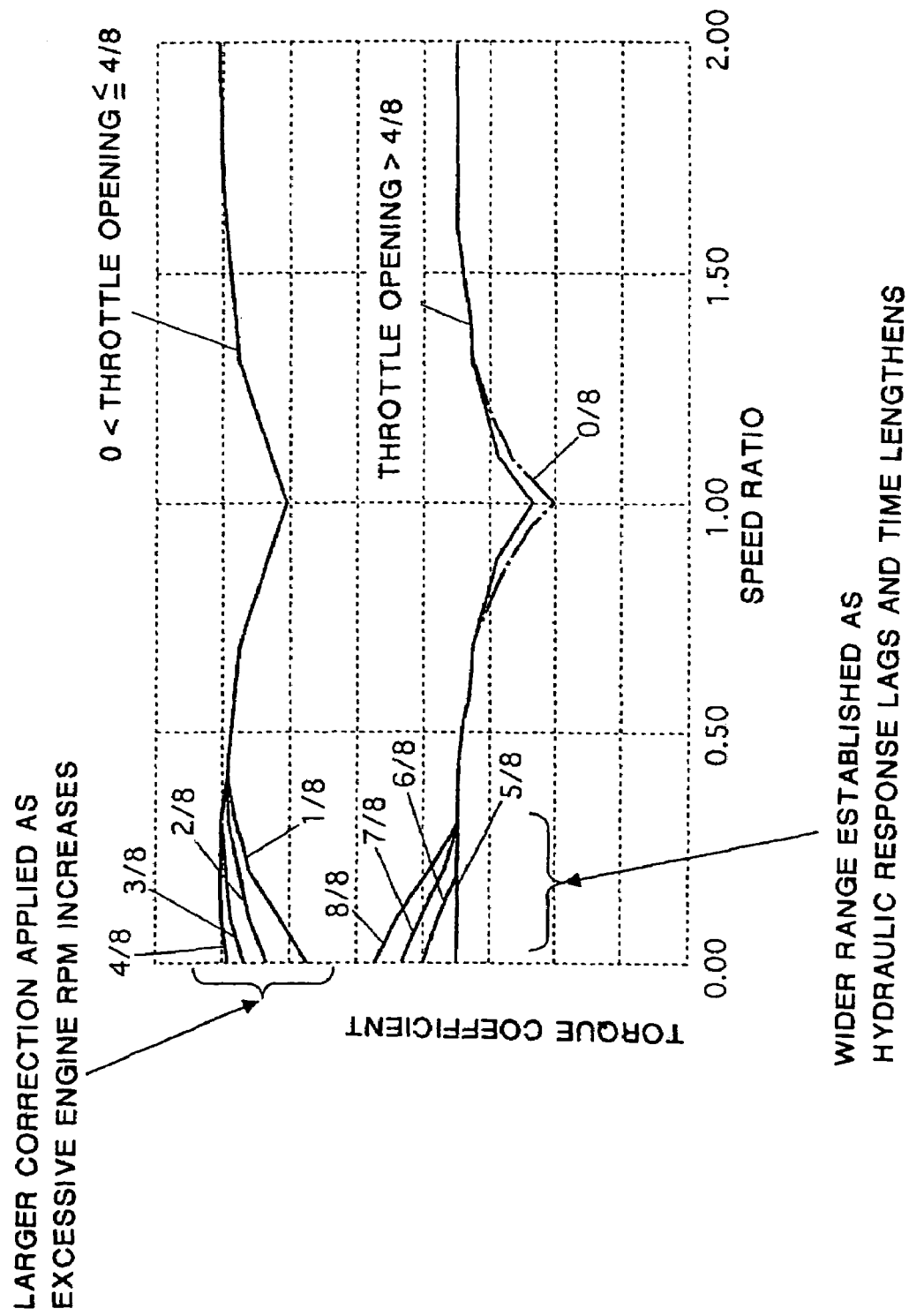
FIG. 3 is a torque map exemplifying the type of torque map employed by the first embodiment.

At step S4, a torque coefficient, which relates to the throttle opening read in at step S2 and the clutch speed ratio calculated at step S3, is determined using a torque coefficient map such as that shown in FIG. 3. Thus, step S4 constitutes a torque coefficient setting section. As explained below, step S4 also constitutes a torque coefficient correction section.

A torque coefficient map, such as is shown in FIG. 3, plots the clutch speed ratio on the horizontal axis and the torque coefficient on the vertical axis. The clutch speed ratio is that of the clutch 20. The lower half of FIG. 3 illustrates the relationship between the clutch speed ratio and the torque coefficient when the throttle is at a 0/8 (fully closed) position or open to a setting greater than 4/8. When the throttle is fully closed, the torque coefficient near the 1.00 clutch speed ratio region is set to a value smaller than that used for the throttle settings greater than 4/8, as shown by the broken line. The upper half of FIG. 3 shows the relationship between speed ratio and torque coefficient for a throttle opening range extending from 0/8 to 4/8 (not including 0/8). The torque coefficient is set to a larger value both for a throttle opening of 0/8 or a throttle opening range greater than 4/8.

The input and output RPM at the 1.00 clutch speed ratio is equivalent to the ratio when the clutch 20 is completely engaged, with the input and output RPM being equal, while a slipping drive condition is present in clutch speed ratios less than 1.00 (except when input RPM is zero and thus provides no vehicle drive power at the 0.00 speed ratio). Also, engine braking on the drive side is induced by the driven side in the clutch speed ratio region greater than 1.00.

The torque coefficient derived from a map such as the map of FIG. 3 is used, with reference to engine RPM and optionally with some further calculation, to set the amount of hydraulic pressure applied in the clutch. As such, the torque coefficient ranges between a value that will set a low hydraulic pressure and low torque (high slip) to a value that will set a high hydraulic pressure and high torque (low slip or fully engaged). The relationship between the torque coefficient and the hydraulic pressure set is not necessarily proportional, and is dependent upon various factors, for example transmission configuration or performance goals, which may be determined by the exercise of ordinary skill. The invention does not depend on the particular values of the torque coefficient, and the use of a torque coefficient in the control of a starting or starting clutch of a CVT is known in the art, as are methods by which such a coefficient is used together with engine RPM in order to determine appropriate hydraulic pressure to be applied in a starting clutch.

In both the top and bottom halves of a map such as that shown in FIG. 3, the torque coefficient is smallest at a clutch speed ratio of 1.00, but increases as the clutch speed ratio decreases or increases to 0.50 or 1.50, and remains approximately constant beyond these clutch speed ratios. When the throttle opening is in a range between 0/8 and 4/8, however, the torque coefficient will decrease as the throttle opening decreases when the clutch speed ratio is less than approximately 0.3.

The differences in the torque coefficient for a throttle opening of 0/8, in the range greater than 4/8, and in the range between 0/8 and 4/8, are due to the non-linear characteristics of engine output torque.

In step S4, the process through which the torque coefficient is determined from the mapped speed ratios and throttle opening is part of a torque coefficient setting method employed by the present invention, as follows.

The torque coefficient is corrected to obtain a larger value when the throttle opening increases for a throttle opening of 0/8, or when the throttle opening range is greater than 4/8 at a low clutch speed ratio, an example being the first correction (the correction for the ">4/8" curve) shown in FIG. 3 applied for a clutch speed ratio of approximately 0.25 or less. The torque coefficient is also corrected to obtain a larger value as the throttle opening increases in the range between 0/8 and 4/8 at a low speed ratio, an example being the second correction (the correction for the "≦4/8" curve) applied for a clutch speed ratio of approximately 0.30 or less (note that, for the upper curve, the lowest curve at the left side of FIG. 3 toward the lowest speed ratios, i.e., the 1/8 curve, is the default or least corrected curve). Each of these regions is a region of speed ratios less than substantially 0.5.

In other words, as shown in the lower half of the FIG. 3 map, when the first correction is applied, the torque coefficient is corrected to a larger value, as shown in the upward rise of the torque coefficient at the leftmost side of the map, as the throttle opening increases from 5/8 to 6/8, 7/8, and 8/8. In a similar manner, as shown in the upper half of the FIG. 3 map, when the second correction is applied, the torque coefficient is corrected to a larger value, as demonstrated by the upward rise of the torque coefficient at the leftmost side of the map, as the throttle opening increases from 1/8 to 2/8, 3/8, and 4/8.

The longer it takes for the hydraulic system to supply hydraulic oil to the vehicle starting clutch, the more correction is applied to the torque coefficient in the high speed ratios (the correction for the ">4/8" curves), as compared to the correction executed for lower speed ratios. In addition, a slow hydraulic response can result from the operating characteristics of the solenoid that supplies hydraulic oil to the starting clutch, the hydraulic circuit structure, the size of the starting clutch, and other factors.

For example, the hydraulic response time lengthens for 6/8 throttle opening, further lengthens for 7/8 throttle opening, and further lengthens for 8/8 throttle opening. As shown in FIG. 3, the torque coefficient correction method applies increased correction to the torque coefficient for a widened range of starting clutch speed ratio as hydraulic response time lag increases. For example, the increased correction is applied to the torque coefficient at 6/8 throttle opening extends from a clutch speed ratio of about 0.00 to about 0.15 (the particular value being non-critical), the increased correction applied to the torque coefficient at 7/8 throttle opening is a wider range of speed ratio (e.g., extending from about 0.00 to above about 0.15), and the increased correction applied to the torque coefficient at 8/8 throttle opening is a yet wider range of speed ratio.

The torque coefficient is corrected so that it is increased relative to (e.g., in proportion to) the extent of excessive engine RPM. The amount of engine RPM considered excessive is determined by engine torque, the size of the starting clutch, and other factors, i.e., depends upon the engine configuration. However, excessive engine RPM is higher for higher throttle openings. Although excessive engine RPM increases in proportion to an increase in throttle opening, the amount of collection applied in step S4 at a low speed ratios increases as the throttle opening widens, thus suppressing excessive engine RPM across a greater range of throttle openings. The correction applied pursuant to step S4 applies an increasing amount of correction to the torque coefficient as the throttle opening widens when the starting clutch operates at a low speed ratio.

In other words, at 1/8 throttle opening, the excessive engine RPM is lowest among the 1/8 through 4/8 throttle openings, and the excessive engine RPM increases for 2/8 throttle opening, further increases for 3/8 throttle opening, and further increases for 4/8 throttle opening. As shown in FIG. 3, the torque coefficient correction method applies an increasing amount of correction to the torque coefficient as excessive engine RPM increases. That is, the increased correction applied to the torque coefficient at 2/8 throttle opening is larger than the correction applied at 1/8 throttle opening, the increased collection applied to the torque coefficient at 3/8 throttle opening is greater yet, and the increased correction applied to the torque coefficient at 4/8 throttle opening is greater yet. The same principle applies to the 5/8 through 8/8 throttle openings, as shown by the lower curve in FIG. 3.

Accordingly the starting clutch 20, as controlled by step S4, applies a torque coefficient correction through which an increase in hydraulic pressure can be supplied to the starting clutch 20 by correcting the starting clutch torque coefficient to a larger value in relation to an increasingly larger throttle opening when the clutch speed ratio of the starting clutch is within a range of smaller speed ratios, therefore making it possible to shorten the hydraulic time lag in order to prevent excessive engine RPM. Thus, step S4 constitutes both a torque coefficient setting section and a torque coefficient correction section.

However, as specified by the torque coefficient correction method according to the present invention, in both the case of the ">4/8" speed ratio curve and the "0/8 to 4/8" speed ratio curve, an increased correction is applied to the torque coefficient in response to a larger throttle opening in the low speed ratio ranges.

Returning to FIG. 2, after the torque coefficient is determined at step S4, the control sequence proceeds to step S5 where the derived torque coefficient is applied (together with the engine RPM) to determine the amount of hydraulic pressure to be supplied to the starting clutch. More specifically, this part of the process generates an activation signal to be applied to the hydraulic pressure supply solenoid. Step S5 is part of the operation process of a hydraulic control device as specified by the present invention. Thus, step S5 constitutes an engaging (hydraulic) pressure control section.

At step S6, the above-noted activation signal is input to a solenoid driver circuit (not shown in the drawings, but conventionally arranged) resulting in hydraulic oil being supplied to the starting clutch 20 at a pressure according to a torque coefficient and the engine RPM, the torque coefficient determined by the previously explained method.

Figure 4:
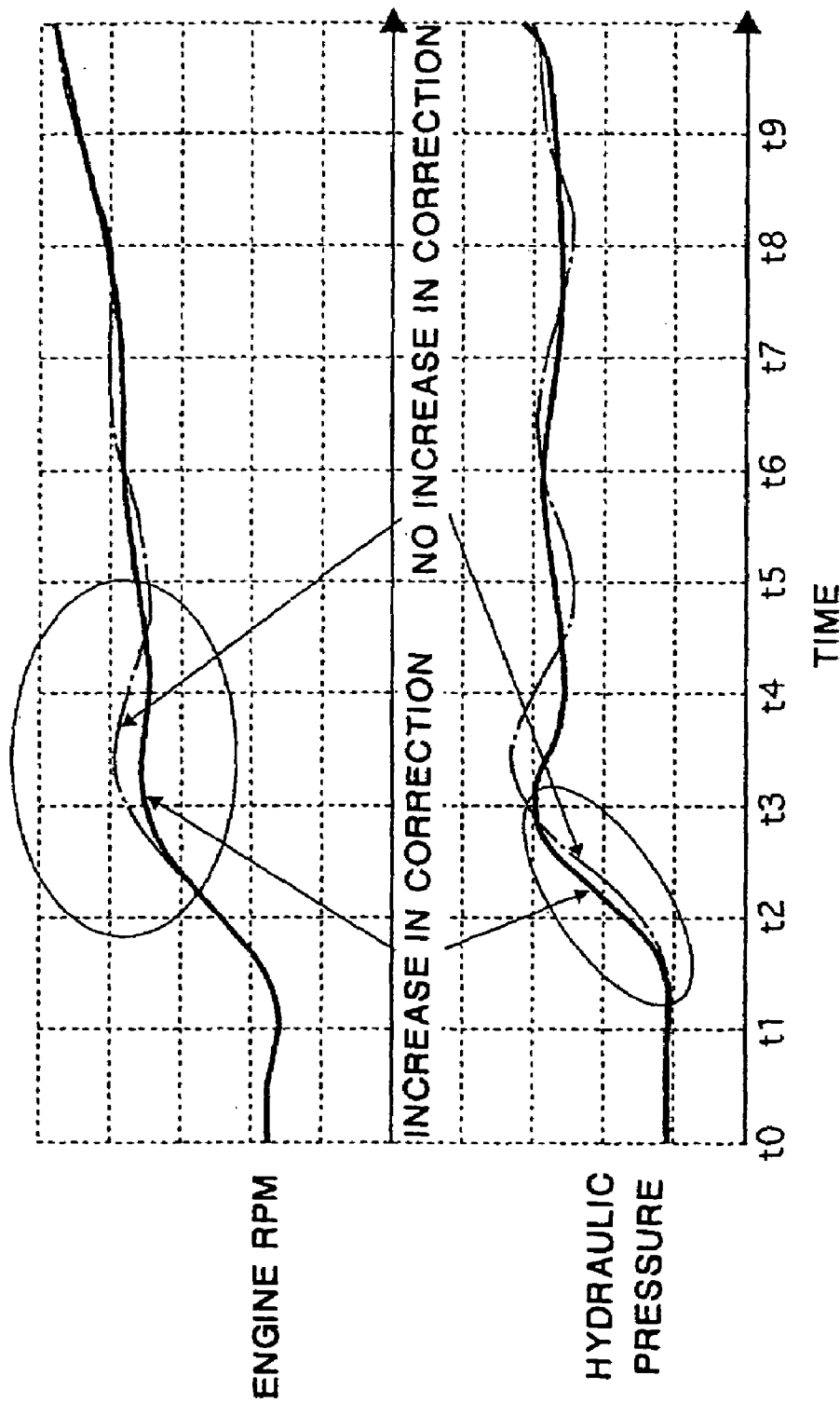
FIG. 4 is a graph comparing the changes in hydraulic pressure and engine RPM, over time, executed by transmission controller for a comparative control process lacking the features of the present invention and those incurred by the starting clutch control process as applied by the present invention.

FIG. 4 is a graph comparing changes in hydraulic pressure applied to the starting clutch and engine RPM, over time, when increased correction is applied to the torque coefficient in response to throttle opening in the low speed ratio range, and when an increase in torque coefficient correction is not applied.

During the time that transpires between t1 and t3, a faster rise in hydraulic pressure occurs when torque coefficient correction is increased, as compared to no correction being applied. That is, as the time phase progresses from t2 to t4, engine RPM is suppressed when an increased (large) torque coefficient correction (such as that applied by the invention) is applied to a further extent than when no increase in torque coefficient correction is applied. The suppression of excessive engine RPM and the faster rise in hydraulic pressure provide control benefits of lowering the maximum hydraulic pressure and reducing the pressure differential range.

The following will explain selected advantages of the invention, although the invention does not require any particular one of these advantages.

The starting clutch control device, as embodied in this specification, applies an increasing amount of correction to the torque coefficient as the throttle opening widens when the starting clutch operates at a low speed ratio, thereby inducing a quick rise in the hydraulic pressure applied to the starting clutch to reduce the lag in hydraulic response time, thus making it possible to suppress excessive engine RPM. Although excessive engine RPM increases in proportion to an increase in throttle opening, the amount of correction applied at a low speed ratios increases as the throttle opening widens, thus suppressing excessive engine RPM across a wider range of throttle openings.

Because the clutch speed ratio region to which the increased torque coefficient correction is to be applied widens as the lag in hydraulic response time increases, matching the correction to the clutch speed ratio region enables excessive RPM to be suppressed even though hydraulic response lag times may differ.

The extent of correction applied to the torque coefficient increases as excessive engine RPM increases, thereby making it possible to suppress excessive engine RPM even though engine RPM may vary.

A smaller torque coefficient is established for a throttle opening of approximately zero (0) and a range beginning with a predetermined value (4/8 for example), and a larger torque coefficient is established for a throttle opening range less than a predetermined value, and the torque coefficient determination process switches between these two ranges in response to throttle opening. An increased correctional value is applied separately to the small torque coefficient and large torque coefficient in the low speed ratio range. As a result of these operations, the hydraulic pressure supplied to the starting clutch can be controlled to match the non-linear characteristics of the torque output by the engine.

Although the first embodiment describes a vehicle starting clutch controller, in practical application, the starting clutch controller is not limited to the type described in the embodiment, and various variations, modifications, and additions may be made without departing from the scope of the claims.

In the first embodiment, a starting clutch control system is applied to control engagement of a starting clutch and reverse brake or clutch of a vehicle equipped with a belt-type stepless transmission. The starting clutch control system, however, may also be applied to a vehicle equipped with a stepped automatic transmission, a toroidal stepless transmission, an automatically controlled manual transmission, or to a hybrid or electric vehicle; that is, the starting clutch control system may be applied to any vehicle equipped with a clutch that engages in order to transfer engine torque as the input torque required to start a vehicle.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its versions. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims. Alternative structures discussed for the purpose of highlighting the invention's advantages do not constitute prior art unless expressly so identified. No one or more features of the present invention are necessary or critical unless otherwise specified.

What is claimed is:

1. A starting clutch control device comprising:
   a starting clutch configured and arranged to be operatively coupled between an engine and a transmission installed in a vehicle;
   a torque coefficient setting section configured to set a torque coefficient based on a clutch speed ratio of the starting clutch and a throttle opening of the engine;
   a torque coefficient correction section configured to increase the torque coefficient by a torque coefficient correction amount, the torque coefficient correction section being further configured to increase the torque coefficient by progressively adjusting the torque coefficient correction amount as the throttle opening increases when the clutch speed ratio is within a predetermined clutch engagement speed ratio region; and
   an engaging pressure control section configured to control an engaging pressure supplied to the starting clutch based on the torque coefficient and an engine rotational speed of the engine.

2. The starting clutch control device according to claim 1, wherein
   the torque coefficient correction section is further configured to adjust the predetermined clutch engagement speed ratio region to a progressively larger speed ratio region starting at a zero speed ratio as a response time lag for the engaging pressure applied to the starting clutch increases.

3. The vehicle starting clutch control device according to claim 1, wherein
   the torque coefficient correction section is further configured to increase the torque coefficient by progressively adjusting the torque coefficient correction amount as excessive engine rotational speed increases.

4. The starting clutch control device according to claim 1, wherein
   the torque coefficient setting section is further configured to switch between a lesser torque coefficient range for the predetermined clutch engagement speed ratio region that is employed both for a first throttle opening of approximately zero and for a throttle opening range larger than a predetermined throttle opening value, and a greater torque coefficient range employed for a second throttle opening range extending from above approximately zero to a throttle opening less than or equal to the predetermined value, and
   the torque coefficient correction section is further configured to increase the torque coefficient for the lesser torque coefficient range of the predetermined clutch engagement speed ratio region separately from the torque coefficient for the greater torque coefficient range of the predetermined clutch engagement speed ratio region.

5. The starting clutch control device according to claim 4, wherein
the torque coefficient correction section is further configured to set the predetermined clutch engagement speed ratio region for the lesser torque coefficient range to occur when the clutch speed ratio is zero to approximately 0.25, and
the torque coefficient correction section is further configured set the predetermined clutch engagement speed ratio region for the greater torque coefficient range to occur when the clutch speed ratio is zero to approximately 0.3.

6. The starting clutch control device according to claim 1, further comprising
a clutch speed ratio sensor configured to measure the clutch speed ratio of the starting clutch;
a throttle opening sensor configured to measure the throttle opening of the engine; and
an engine rotational speed sensor configured to measure the engine rotational speed of the engine.

7. The starting clutch control device according to claim 6, wherein
the torque coefficient setting section, the torque coefficient correction section and engaging pressure setting section are formed by a controller that reads the clutch speed ratio, the throttle opening and the engine rotational speed.

8. The starting clutch control device according to claim 6, wherein
the torque coefficient correction section is further configured to adjust the predetermined clutch engagement speed ratio region to a progressively larger speed ratio region starting at a zero speed ratio as a response time lag for the engaging pressure applied to the starting clutch increases.

9. The starting clutch control device according to claim 6, wherein
the torque coefficient correction section is further configured to increase the torque coefficient by progressively adjusting the torque coefficient correction amount as excessive engine rotational speed increases.

10. The starting clutch control device according to claim 6, wherein
the torque coefficient setting section is further configured to switch between a lesser torque coefficient range for the predetermined clutch engagement speed ratio region that is employed both for a first throttle opening of approximately zero and for a throttle opening range larger than a predetermined throttle opening value, and a greater torque coefficient range employed for a second throttle opening range extending from above approximately zero to a throttle opening less than or equal to the predetermined value, and
the torque coefficient correction section is further configured to increase the torque coefficient for the lesser torque coefficient range of the predetermined clutch engagement speed ratio region separately from the torque coefficient for the greater torque coefficient range of the predetermined clutch engagement speed ratio region.

11. The starting clutch control device according to claim 6, wherein
the torque coefficient correction section is further configured to set the predetermined clutch engagement speed ratio region for the lesser torque coefficient range to occur when the clutch speed ratio is zero to approximately 0.25, and
the torque coefficient correction section is further configured to set the predetermined clutch engagement speed ratio region for the greater torque coefficient range to occur when the clutch speed ratio is zero to approximately 0.3.

12. The starting clutch control device according to claim 6, wherein
the torque coefficient correction section is further configured set the predetermined clutch engagement speed ratio region to occur when the clutch speed ratio is below approximately 0.5.

13. A method of controlling a starting clutch disposed between an engine and a transmission installed to a vehicle, comprising:
detecting a clutch speed ratio of the starting clutch;
detecting a throttle opening of the engine;
detecting an engine rotational speed of the engine;
setting a torque coefficient based on the clutch speed ratio and the throttle opening, the torque coefficient relating to a desired amount of torque to be transmitted by the starting clutch;
correcting the torque coefficient by increasing the torque coefficient by a progressively larger torque coefficient correction amount within a predetermined clutch engagement speed ratio region starting at a zero clutch speed ratio; and
setting an engaging pressure to be applied within the starting clutch according to the engine rotational speed and to the torque coefficient as corrected.

14. The method according to claim 13, wherein
the correcting further comprises increasing the torque coefficient within a progressively larger region starting at a zero speed ratio as a response time lag for the engaging pressure applied to the starting clutch increases.

15. The method according to claim 13, wherein
the correcting further comprises increasing the torque coefficient by a progressively larger torque coefficient correction amount as excessive engine rotational speed increases.

16. The method according to claim 13, wherein
the setting of the torque coefficient further comprises switching between a lesser torque coefficient range for the predetermined clutch engagement speed ratio region that is employed both for a throttle opening of approximately zero and for a throttle opening range larger than a predetermined throttle opening value, and a greater torque coefficient range for the predetermined clutch engagement speed ratio region that is employed for a throttle opening range extending from above approximately zero to a throttle opening less than or equal to the predetermined throttle opening value, and
the correcting of the torque coefficient further comprises increasing the torque coefficient for the lesser torque coefficient range of the predetermined clutch engagement speed ratio region separately from the torque coefficient for the greater torque coefficient range of the predetermined clutch engagement speed ratio region.

17. The method according to claim 16, wherein
the correcting of the torque coefficient further comprises setting the predetermined clutch engagement speed ratio region for the lesser torque coefficient range to occur when the clutch speed ratio is zero to approximately 0.25, and
the correcting of the torque coefficient further comprises setting the predetermined clutch engagement speed ratio region for the greater torque coefficient range to occur when the clutch speed ratio is zero to approximately 0.3.

* * * * *